J. M. KLEIN & P. J. SPIES.
WIRE CLAMP OR STRETCHER.
APPLICATION FILED NOV. 15, 1907.
1,146,801.
Patented July 20, 1915.
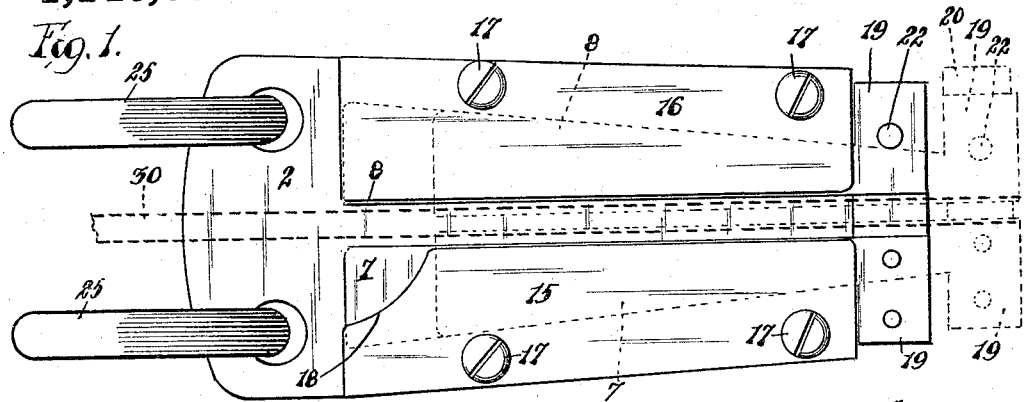
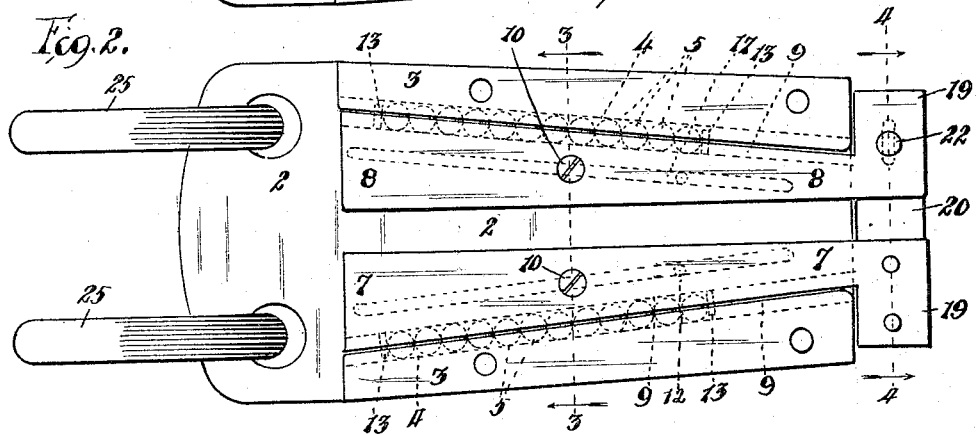
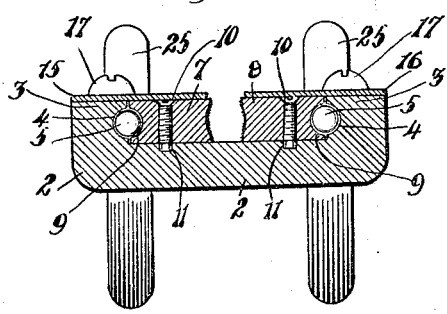
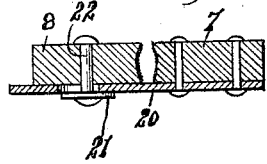
Witnesses:
Wm. P. Bond
Mae C. Lindauer
Inventors:
J. M. Klein & P. J. Spies
by Prim & Fisher
Attys.
COLUMBIA PLANOGRAPH CO., WASHINGTON, D. C.

UNITED STATES PATENT OFFICE.

JOHN M. KLEIN AND PHILIP J. SPIES, OF CHICAGO, ILLINOIS; SAID SPIES ASSIGNOR TO SAID KLEIN.

WIRE CLAMP OR STRETCHER.

1,146,801.      Specification of Letters Patent.      Patented July 20, 1915.

Application filed November 15, 1907. Serial No. 402,253.

*To all whom it may concern:*

Be it known that we, JOHN M. KLEIN and PHILIP J. SPIES, citizens of the United States, and residents of Chicago, county of Cook, and State of Illinois, have invented certain new and useful Improvements in Wire Clamps or Stretchers, of which we do declare the following to be a full, clear, and exact description, reference being had to the accompanying drawing, forming part of this specification.

The present invention has for its object to provide an improved construction of wire clamp or stretcher of that type in which the clamping jaws are actuated by inclined or wedge shaped parts to cause the jaws to firmly grasp the wire to be stretched.

Wire stretchers or clamps have heretofore been formed with jaws actuated by inclined guides so as to cause the jaws to approach each other in order to grip the wire but one difficulty encountered with this type of wire stretchers is that the friction incident to the movement of the jaws along the inclines was so great as to frequently cause the wire to be pulled or stripped from the jaws.

One main object of our invention is to provide a wire clamp in which the jaws are actuated by inclined guides so that a uniform bearing of the jaws upon the wire is secured and so that the friction between the jaws and their actuating wedges is reduced to such extent that the pulling or stripping of the wire from the jaws will not occur.

The invention consists in the features of novelty hereinafter described and illustrated in the accompanying drawing and particularly pointed out in the claims at the end of the specification.

Figure I is a plan view of a clamp embodying our invention. Fig. II is a view similar to Fig. I with the retaining plates removed. Fig. III is a view in transverse section on line 3—3 of Fig. II but showing the clamp plates in position. Fig. IV is a view in section on line 4—4 of Fig. II.

2 designates the body portion of the jaw which may be of any suitable construction, this body portion being provided with the guides 3 having inclined inner edges that are provided with concave grooves 4 to form channels for the bearing balls 5. Within the space formed between the guides 3 are placed the jaws 7 and 8, the outer edges of which are inclined to correspond with the inclination of the guides 3. These outer edges of the jaws 7 and 8 are provided with concave grooves or channels 9 to form guideways for the balls 5. Through each of the jaw members 7 and 8 pass screws or pins 10, the lower ends of which project into inclined grooves 11 that are extended parallel with the inner edges of the inclined guides 3. One or more stop pins 12 are fixed in the inclined groove 11 and by contacting with the lower ends of the screws or pins 10 limit the outward movement of the jaws. Stop pins 13 project from the outer edges of the jaw members 7 and 8 to retain the bearing balls 5 in position. As shown, retaining plates 15 and 16 are secured as by screws 17 upon the outer faces of the inclined guides 3, these screws passing through the plates and entering threaded holes formed in the guides; and these retaining plates overlap the jaws, as shown, and serve not only to retain them in position but prevent the access of dirt and the like to the bearing balls and their guide-ways. The corner of one of the retaining plates 15 is cut away as at 18 so as to enable the jaws to be conveniently drawn back by the hand of the operator when desired.

As shown, the ends of the jaws 7 and 8 are formed with offset portions 19, the offset portion of one of the jaws 7 being securely riveted to a union plate 20 while the offset portion at the end of the jaw 8 is united by a loose connection to the union plate. As shown, the loose connection between the jaw 8 and the union plate 20 is effected by a pin 22, the end of which projects through the offset portion of the jaw 8 and through a slot formed in the union plate 20, the end of the pin being upset and carrying a washer 21. This union plate insures the unison back and forth movement of the jaws. The inner opposing faces of the jaws 7 and 8 are parallel and are preferably milled or roughened to enable them to more securely "bite" or grip upon the wire to be clamped. The end of the clamp body may be provided with rings 25 or other devices by which the clamp may be carried or suspended.

From the foregoing description, it will be seen that when a wire 30 (indicated by dotted lines) has been placed between the parallel opposing faces of the jaws 7 and 8, the jaws will tightly bind upon the wire and as tension is exerted upon the wire, the jaws will be moved outward and will be forced by the inclined guides firmly against the wire. The ball bearings interposed between the wedge shaped jaws and the corresponding inclined guides relieve the friction between said parts so that all danger of the wire being drawn or stripped from the clamp is avoided.

It is manifest that the precise details of construction above set out may be varied without departure from the spirit of the invention. Thus for example, it is not essential that the inclined outer edge portions of the jaws shall be formed integral with the jaws although this is deemed the preferable construction. It is manifest also that features of the invention may be employed without its adoption as an entirety.

Having thus described our invention what we claim as new and desire to secure by Letters Patent is:

1. A wire clamp comprising a body portion having inwardly projecting guide flanges at its opposite side edges, said guides having longitudinally grooved inner edges, a pair of wedge-shaped clamp jaws connected for simultaneous movement, said jaws having inner, parallel, wire engaging edges and outer, longitudinally grooved inclined edges, rows of contacting bearing balls interposed between and retained in the longitudinally grooved edges of said guides and said jaws, pins on said jaws engaging the end balls of each row and retaining said balls against longitudinal movement relatively to said jaws, said body portion having inclined grooves in its side face parallel with the inclined edges of said guides, pins extending through said jaws and engaging said grooves, and retaining plates detachably secured to said guides and overlapping said jaws, the inner edges of said spacing plates being spaced apart whereby said jaws are open throughout their length to admit a length of wire laterally between the same, substantially as described.

2. A wire clamp comprising a body portion having raised guides at its side edges, said guides being provided with inclined edges, a pair of wedge-shaped clamping jaws seated on the face of said body portion and having inner, parallel, wire-engaging edges and outer, inclined edges opposed to the inclined edges of said guides, said body portion having inclined grooves in its side face parallel with the inclined edges of said jaws and guides, pins extending through said jaws and engaging said grooves, retaining plates detachably secured to said guides and overlapping said jaws, and a member extending beneath the outer ends of said jaws, said member being rigidly secured to one of said jaws and having a transverse pin and slot connection with the other of said jaws for producing simultaneous movement of said jaws, said retaining plates being spaced apart at their inner edges whereby said jaws may be opened throughout their length to admit a length of wire laterally between them, substantially as described.

JOHN M. KLEIN.
PHILIP J. SPIES.

Witnesses:
GEORGE P. FISHER, Jr.,
KATHARINE GERLACH.